US012678729B2

(12) United States Patent
Nguyen et al.

(10) Patent No.: US 12,678,729 B2
(45) Date of Patent: Jul. 14, 2026

(54) SOLVENT SYSTEMS FOR CARBON DIOXIDE CAPTURE AND METHODS OF MAKING AND USING SAID SYSTEMS

(71) Applicant: Schlumberger Technology Corporation, Sugar Land, TX (US)

(72) Inventors: Dinh Thu Nguyen, Cambridge, MA (US); Richa Sharma, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 237 days.

(21) Appl. No.: 18/667,861

(22) Filed: May 17, 2024

(65) Prior Publication Data

US 2025/0161867 A1 May 22, 2025

Related U.S. Application Data

(60) Provisional application No. 63/600,147, filed on Nov. 17, 2023, provisional application No. 63/599,571, filed on Nov. 16, 2023.

(51) Int. Cl.
*B01D 53/14* (2006.01)
*B01D 53/62* (2006.01)

(52) U.S. Cl.
CPC ..... *B01D 53/1493* (2013.01); *B01D 53/1475* (2013.01); *B01D 53/62* (2013.01);
(Continued)

(58) Field of Classification Search
CPC ............ B01D 53/1493; B01D 53/1475; B01D 53/62; B01D 2252/20442;
(Continued)

(56) References Cited

U.S. PATENT DOCUMENTS

| 7,901,487 | B2 | 3/2011 | Rochelle |
| 8,388,855 | B2 | 3/2013 | Rochelle |

(Continued)

FOREIGN PATENT DOCUMENTS

WO 2010134926 A1 11/2010

OTHER PUBLICATIONS

Rochelle et al. "Aqueous piperazine as the new standard for CO2 capture technology" Chemical Engineering Journal 171 (2011) 725-733 (Year: 2021).*
Gangarapu, S. et al., "Quantum Chemical Studies on Solvents for Post-Combustion Carbon Dioxide Capture: Calculation of pKa and Carbamate Stability of Disubstituted Piperazines", ChemPhysChem, Apr. 29, 2014, pp. 1880-1886, vol. 15.
(Continued)

*Primary Examiner* — Wayne A Langel
*Assistant Examiner* — Syed T Iqbal
(74) *Attorney, Agent, or Firm* — Jeffrey D. Frantz

(57) ABSTRACT

Amine-based solvents, carbon dioxide capture systems, and methods for improving stability of carbamate during carbon dioxide capture are disclosed herein. The amine-based solvents comprise at least one cyclic amine having a first molecular site that is structurally modified to be protonated and a second molecular site that is structurally modified to hold carbon dioxide as carbamate. The carbon dioxide capture systems comprise at least one gaseous stream comprising carbon dioxide and the amine-based solvent in contact with the at least one gaseous stream. The methods for carbon dioxide capture comprise contacting at least one modified cyclic amine to a gaseous stream comprising carbon dioxide such that the modified at least one cyclic amine chemically reacts with carbon dioxide to form a soluble compound.

14 Claims, 13 Drawing Sheets

(52) U.S. Cl.
CPC .............. *B01D 2252/20442* (2013.01); *B01D 2252/20447* (2013.01); *B01D 2252/20489* (2013.01); *B01D 2252/20494* (2013.01); *B01D 2257/504* (2013.01)

(58) Field of Classification Search
CPC ........... B01D 2252/20447; B01D 2252/20489; B01D 2252/20494; B01D 2257/504; B01D 2252/2041; B01D 2252/20415; B01D 2252/20421; B01D 2252/20431; B01D 2252/20484
See application file for complete search history.

(56) References Cited

U.S. PATENT DOCUMENTS

| | | | |
|---|---|---|---|
| 8,715,397 B2 | 5/2014 | Kortunov | |
| 2012/0308457 A1* | 12/2012 | Yoon .................. | B01D 53/1493 |
| | | | 252/190 |

OTHER PUBLICATIONS

Conway, W. et al., "Reaction of CO2 with Aqueous Piperazine Solutions: Formation and Decomposition of Mono- and Dicarbamic Acids/Carbamataes of Piperazine at 25.0° C." , The Journal of Physical Chemistry A. Jan. 2013. pp. 806-813, vol. 117, No. 5.
Chen, X. et al., "Aqueous piperazine derivatives for CO2 capture: Accurate screening by a wetted wall column", Chemical Engineering Research and Design, Sep. 2011, pp. 1693-1710, vol. 89, No. 9.

\* cited by examiner

SOLVENT SYSTEMS FOR CARBON DIOXIDE CAPTURE AND METHODS OF MAKING AND USING SAID SYSTEMS

CROSS REFERENCE TO RELATED APPLICATION

This application claims the benefit under 35 U.S.C. § 119(e) of U.S. Provisional Patent Application No. 63/600,147, filed on Nov. 17, 2023, and U.S. Provisional Application No. 63/599,571, filed on Nov. 16, 2023, both of which are incorporated herein by reference, in their entirety.

FIELD OF THE DISCLOSURE

The present disclosure relates to improved solvent systems for carbon dioxide (hereinafter "CO2") capture, methods of making the improved solvent systems, and methods of using the improved solvent systems for chemical CO2 capture (hereinafter "CO2 capture"). The improved solvent systems disclosed herein comprise at least one organic compound having at least one nitrogen atom and the methods disclosed herein comprise contacting the improved solvent systems with gas streams having or comprising CO2 therein.

BACKGROUND

Known carbon capture techniques utilize absorption processes by amine-based solvents and involve reversible reactions between CO2 and liquid solutions of amines with diluents. A wide variety of amine-based solvents have been employed for CO2 absorption-based capture. Most of these amine-based solvents may be categorized into three main families of formulations: (i) single-component alkanolamine, such as monoethanolamine (hereinafter "MEA") or N-methyldiethanolamine (hereinafter "MDEA"), (ii) blends of alkanolamine solutions to optimize absorption capacity and reduce regeneration costs, and (iii) blends of alkanolamine incorporating an absorption activator like piperazine or its derivatives to enhance absorption kinetics.

It has been shown that in specific absorption systems and/or amine-based solvents, these reversible reactions may form a complex mixture in a capture solution. The complex mixture typically comprises carbamate, carbonate, and/or bicarbonate in the form of one or more separated ions, one or more zwitterions, or a combination thereof. The resulting products (including the complex mixture) in the capture solution are strongly dependent on the nature and composition of the fresh amine solvent. The presence of carbonate and/or bicarbonate is commonly found, but not exclusively, when the amine solvent contains an intermolecular hydroxyl ion (OH—) or intramolecular hydroxyl functional groups. From practical perspectives, it is preferable to design absorption solvents that preserve carbamate products under different operating conditions, especially in applications where water is present, such as, for example, post-combustion capture. The existence of carbamate and/or carbonate/bicarbonate in the absorption or capture solution greatly limits development of an accurate process model due to the lack of thermodynamic data for the resulting products or complex mixture. Similarly, decomposition of carbamate also hinders the optimization of operating conditions and the development of process monitoring methodologies. Moreover, the existence of both carbamate and/or carbonate/bicarbonate in the absorption or capture solution and the decomposition of carbamate are significant disadvantages associated with these known amine-based solvent carbon capture techniques.

The solvent systems and methods disclosed herein may comprise one or more optimized solvent blends of one or more amines which may be focused for optimizing the solvent chemistry for post combustion capture systems. In contrast, known carbon capture solvents are limited to optimization of one or more physicochemical properties from the process design perspective. A fundamental relationship between the reaction mechanism and stability is particularly elusive in these known solvent optimization studies.

Primary pathways for the reaction between an amine-based solvent and CO2 involve formation of carbamate and bicarbonate, which compete with each other. Carbamate formation begins when the amino site of an amine molecule attacks the electrophilic carbon of CO2, resulting in a zwitterion intermediate (hereinafter "equation 1"). This zwitterion then transfers a proton to the amino site of another unreacted amine, forming carbamate (hereinafter "equation 2"). Carbamate hydrolysis or decomposition occurs as the proton shifts from the protonated amine to the carbamate, leading to the formation of bicarbonate and free amine (hereinafter "equation 4"). On the other hand, direct hydration of CO2 to bicarbonate in the presence of amine as the base catalyst (hereinafter "equation 3") is also a significant pathway for certain amines. Direct hydrolysis of CO2 is slower compared to carbamate formation, but bicarbonates allow for higher loading than carbamates. Numerous steric effects may be crucial in determining the mechanism of the CO2 capture reaction. However, the underlying mechanisms driving the preferential formation of carbamate or bicarbonate remain ambiguous.

The improved solvent systems and methods disclosed herein may comprise, include, or consist of one or more sterically hindered alkanolamines (i.e., varying in methylation, chain length, and substituents positioned near or far from the amino site or nitrogen atom) that have been observed experimentally to influence the propensity for carbamate or bicarbonate formation. To develop high-performance absorbents such as the improved solvent systems and methods disclosed herein, one needs to have a comprehensive mechanistic understanding of the specific reaction pathway of carbamate hydrolysis or the direct conversion of carbamate to bicarbonate (i.e., above-mentioned equation 4). Amines with diverse structures display varying degrees of carbamate hydrolysis. Certain amines predominantly form carbamates at low CO2 loadings but undergo rapid hydrolysis to produce bicarbonates when their carbamates become voluminous at high CO2 loadings. Very little is known about the factors that govern carbamate hydrolysis. The present disclosure investigates the impact of site-preferences for carbamates and protonated amines on their stability and introduces a new concept of inter-site stability to rationalize the stability of carbamate based on chemical structure of the molecule, particularly the arrangement of the amino sites and their distinct preferences for carbamate vs protonated amine formation. The fundamental mechanism of this inter-site stability is experimentally substantiated with respect to the working examples disclosed herein. To demonstrate the application of this mechanistic understanding, some amine systems, forming unstable carbamate as product in the presence of water, may be modified based on the inter-site stability rationale to induce higher product stability and uniformity.

Surprisingly, the improved solvent systems and methods disclosed herein overcome the disadvantages of the known carbon capture techniques by achieving, predicting, and providing an improved product selectivity in the carbon capture by amine-based solvents. This improved product selectivity is important with respect to amine-based solvent carbon capture as amine-based solvents for carbon capture expand into more complex amine molecules as well as amine-based solvent blends. Likewise, insights in the categorization of structural effects on capture product chemistry may remarkably drive the novel solvent screening at an improved and/or higher pace. Due to the significant role of multi-level capture product formation in the CO2 absorption technology, at least one relevant and key factor, governing the product selectivity, may be modulated by one or more different structural features or gears as disclosed herein.

SUMMARY OF THE DISCLOSURE

In one or more embodiments, amine-based solvents improve stabilities of carbamates during carbon dioxide captures and comprise at least one piperazine having a first molecular site that is structural modified to be protonated and a second molecular site that is structural modified to hold carbon dioxide as carbamate.

In one embodiment, the first molecular site is a protonated site and the second molecular site is a carbamate site and the protonated site and the carbamate site are intra-molecularly connected in the same amine molecule of the at least one piperazine.

In one embodiment, the at least one piperazine comprises 2,5-dimethyl-piperazine having a structural modification such that a methyl group is provided at the alpha position for the first molecular site and the methyl group at the alpha position for the second molecular site is excluded.

In one embodiment, the amine-based solvent further comprises at least one morpholine, piperidine, and triethanolamine.

In one embodiment, the at least one piperazine comprises 2,5-dimethyl-piperazine having a structural modification such that a methyl group is moved from the alpha position to the 1-position for the first molecular site and the methyl group for the second molecular site is excluded.

In one embodiment, the amine-based solvent further comprises one or more selected from morpholine, piperidine, and triethanolamine.

In one embodiment, the first molecular site is a protonated site, the second molecular site is a carbamate site, and the at least one piperazine further comprises: a methyl group present at an alpha position for the protonated site and an alpha position for the carbamate site that is free of a methyl group; or a methyl group present at 1-position for the protonated site and a nitrogen site for the carbamate that is free of steric hindrance.

In one embodiment, the at least one piperazine comprises 2,5-dimethyl-piperazine and the amine-based solvent further comprises morpholine.

In one embodiment, the proton from $NH_2^+(CH_2)_2$ of morpholine moved to the 2,5-dimethyl-piperazine.

In one embodiment, the $NH(CH_2)_2$ amino site of the morpholine is configured to hold a carbamate moiety in a mixed solution with the 2,5-dimethyl-piperazine.

In one or more embodiments, carbon dioxide capture systems comprise at least one gaseous stream comprising carbon dioxide and the present amine-based solvent disclosed herein in contact with the at least one gaseous stream.

In at least one embodiment, methods prepare an amine-based solvents configured to improve stabilities of carbamates during carbon dioxide captures, wherein the methods comprise modifying at least one cyclic amine molecule by at least one of an intramolecular site structure modulation and an intermolecular site structure modulation to provide the amine-based solvent such that a first molecular site of the at least one cyclic amine molecule is configured to be protonated and a second molecular site of the at least one cyclic amine molecule is configured to hold carbon dioxide as carbamate.

In one embodiment, the modification of the at least one cyclic amine further comprises imposing a greater steric hindrance on the first molecular site to be protonated and removing a steric hindrance on the second molecular site to hold carbon dioxide as carbamate.

In one embodiment, the modification of the at least one cyclic amine further comprises adding a methyl group to an alpha position for the first molecular site to be protonated and removing a methyl group from an alpha position for the second molecular site to hold carbon dioxide as carbamate or moving a methyl group from an alpha position to a 1-position for the first molecular site to be protonated and removing a steric hindrance on a N site for the second molecular site to hold carbon dioxide as carbamate.

In one embodiment, the methods further comprise intra-molecularly connecting the first molecular site and the second molecular site in the at least one cyclic amine molecule.

In at least one embodiment, the at least one cyclic amine comprises 2,5-dimethyl-piperazine, morpholine, or a combination thereof.

In one embodiment, the at least one cyclic amine comprises 2,5-dimethyl-piperazine, morpholine, piperidine, triethanolamine, or a combination thereof.

In one or more embodiments methods for carbon dioxide capture comprise contacting the modified at least one cyclic amine molecule disclosed herein to a gaseous stream comprising carbon dioxide such that the modified at least one cyclic amine molecule chemically reacts with carbon dioxide to form a soluble compound.

In one embodiment, the methods further comprising at least one of: separating the modified at least one cyclic amine molecule and/or the formed soluble compound from a remaining portion of the gaseous stream; releasing the remaining portion of the gaseous stream; and separating the formed soluble compound from the modified at least one cyclic amine molecule.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
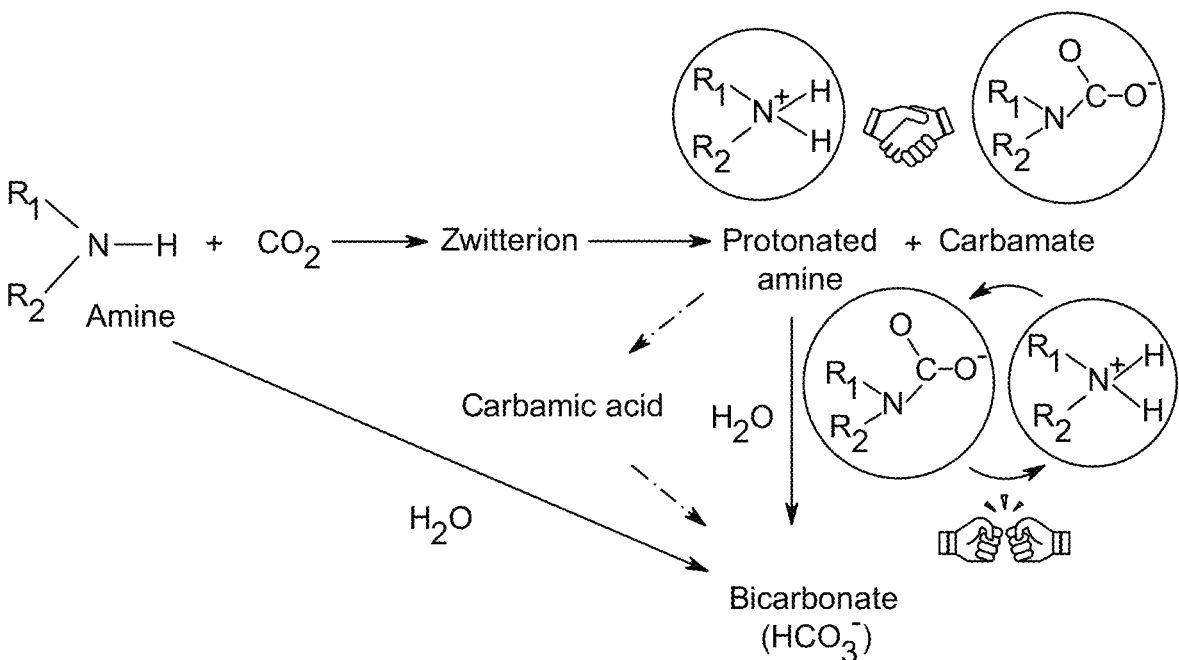
FIG. 1 illustrates schematics of reaction pathways of an amine solvent with CO2, according to one or more embodiments of the present disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

The improved amine-based solvent systems (hereinafter "the improved solvent systems") and methods of preparing, producing, and/or using the improved solvent systems disclosed herein may comprise, include, utilize, or consist of one or more amine absorption chemistries adapted to capture or configured for capturing CO2 during CO2 capture and/or subsequently holding the CO2 after the CO2 capture. The CO2 capture by the amine absorption chemistries of the improved solvent systems may be at least one pre-combustion capture, at least one oxy-combustion capture, at least one post-combustion carbon capture, or a combination thereof. In some embodiments, the improved solvent systems disclosed herein may be included in, incorporated into, and/or utilized within one or more large-scale carbon capture, utilization, and storage (hereinafter "CCUS") systems, methods, and/or processes.

In one or more embodiments, one or more CCUS technologies may include, incorporate, and/or utilize the improved solvent systems disclosed herein for the CO2 capture, CO2 utilization, CO2 storage, or a mixture thereof. The improved solvent systems disclosed herein may be, have, achieve, exhibit, and/or provide improved higher CO2 absorption efficiencies, improved higher loading capacities, or a combination thereof. As a result, the improved solvent systems disclosed herein may be included, incorporated, and/or utilized in one or more industrial scale applications to capture CO2 from, for example, one or more natural gas extractions, one or more gas refineries, and/or one or more exhaust gases produced by one or more fossil fuel-fired power generations. In some embodiments, methods utilize the improved solvent systems disclosed herein to remove CO2 from one or more gaseous streams, such as, for example, a flue gas, a natural gas, a hydrogen gas, a synthesis gas, one or more waste gas streams, or a combination thereof. In an embodiment, methods utilize the improved solvent systems disclosed herein to capture CO2 of at least one gaseous stream using at least one absorption process, at least one stripping process, or a combination thereof.

In some embodiments, molecular designs and/or chemistries of the improved solvent systems may be configured and/or adapted to improve inter-site stabilities of carbamate sites and/or protonated sites during the CO2 capture. The inter-site stabilities of the carbamate sites and/or the protonated sites may be achieved, developed, induced, prepared, and/or provided by one or more intra-molecular structure modulations, one or more inter-molecular structure modulations, or a combination thereof. As a result of the inter-site stabilities, the improved solvent systems disclosed herein may prevent, substantially prevent, reduce, or substantially reduce decomposition of stable carbamate products during and/or after the CO2 capture. Intra-molecular site structures may be modulated by one or more steric effects, one or more structural modifications, or a combination thereof. One or more steric effects may improve inter-site stabilities of at least two molecular sites (i.e., carbamate site(s) and/or protonated site(s)) by adding, imposing, increasing, inducing, and/or providing a first steric hindrance at, on, or adjacent to at least one first molecular site while, at the same time, eliminating, decreasing, reducing, and/or removing a second steric hindrance from at least one second molecular site, wherein the first steric hindrance is greater than the second steric hindrance. Inter-molecular site structures may be modulated by adding one or more new molecular sites that may be adapted and/or configured to react with CO2 during the CO2 capture and/or hold captured CO2 without decomposing the carbamate products after the CO2 capture.

In one or more embodiments, the improved solvent systems disclosed herein are, comprise, include, or consist of one or more amine-based systems or one or more liquid amine-based solutions (collectively referred to hereinafter as "the amine system", "the amine systems", "the amine solution", or "the amine solutions") comprising one or more absorption solvents and/or one or more amine-based solvents (collectively referred to hereinafter as "the amine solvent" or "the amine solvents"). In at least one embodiment, the amine solvents of the improved solvent systems disclosed herein may be, comprise, include, or consist of one or more cyclic amines, one or more heterocyclic amines, one or more tertiary amines, one or more triols, one or more stereo hindered cyclic amines, or a combination or blend thereof. In some embodiments, the amine solvents may be, comprise, include, or consist of one or more organic compounds having at least one heterocycle feature, one or more alcohol groups, one or more amines groups, one or more ether groups, one or more piperazine groups, or a combination thereof. In an embodiment, the amine solvents disclosed herein may be, comprise, include, or consist of one or more heterorganic compounds, such as, for example, heterocyclic amines, one or more piperazines, one or more piperazine derivatives, or a combination or blend thereof. In other embodiments, the amine solvents may be, comprise, include, or consist of at least one morpholine, at least one piperazine, at least one piperidine, at least one triethanolamine, or a combination or a blend thereof. In one or more embodiments, the amine solvents may be, comprise, include, or consist of at least one of 2,5-dimethylpiperazine, 2-methylpiperazine, homopiperazine, N-n-butylaminoethanol, N-(2-aminoethyl)piperazine, 1-methylpiperazine, 2-(dimethylamino)-2-methylpropan-1-ol, trans-2,5-dimethylpiperazine, 1-ethylpiperazine, N-(2-hydroxyethyl)piperazine, thiomorpholine, 1,4-dimethylpiperazine, 2-(4-methylpiperazin-1-yl)ethanamine, 1-amino-2-butanol, 2,5-diethylpiperazine, 2-ethylpiperazine, 1-(2-hydroxyethyl)-4-methylpiperazine, 2-butylaminoethanol, diisopropanolamine, 2-(methylamino)ethanol, 1-amino-4-methylpiperazine, or a combination or blend thereof.

In some embodiments, the CO2 of at least one gaseous stream may be absorbed by the amine solvents disclosed herein to form at least one absorption system that comprises one or more resulting products (hereinafter "the resulting product" or "the resulting products") and at least one absorption and/or at least one capture solution (collectively referred to hereinafter as "the capture solution"). The resulting products may comprise or consist of a single or sole resulting product or a complex mixture of at least two resulting products. The single or sole resulting product may be, comprise, include, or consist of one or more stable carbamate products and/or the complex mixture of at least two resulting products may be, comprise, include, or consist of at least one stable carbamate product or one or more stable carbamate products, at least one carbonate product or one or more carbonate products, at least one bicarbonate product or one or more bicarbonate products, or a mixture or blend thereof.

Figure 2:
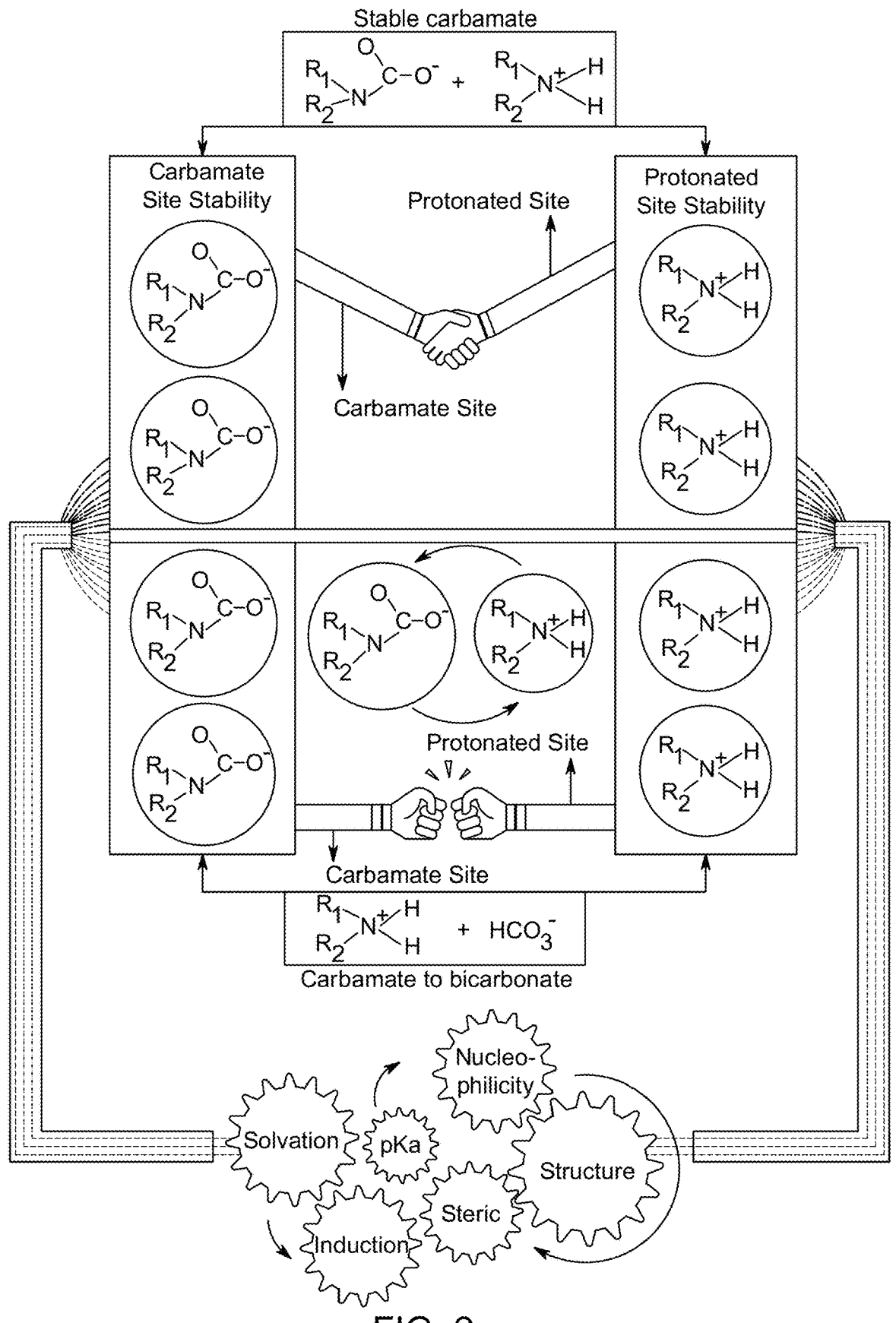
FIG. 2 illustrates schematics of inter-site stability of protonated and carbamate sites in an amine capture solution, according to one or more embodiments of the present disclosure.

In one or more embodiments, at least one governing factor for determining the formation of the resulting product of CO2 absorption by amine solvent at maximum conversion may be a novel concept of inter-site stability of carbamate and protonated sites as shown in FIG. 1. It is shown, theoretically through computational work, that as CO2 is absorbed by the amine solvents, the lone pair electrons of nitrogen atom of amine attack the electrophilic carbon atom of CO2 to form at least one zwitterion (i.e., equation 1). The at least one zwitterion then transfers the proton to at least one different site to form at least one carbamate ion (i.e., equation 2). The carbamate sites and protonated sites are intermolecularly in contact making this state to be critical or at least substantially critical to the overall stability of the carbamate product. If one or more protonated sites are relatively stable in the presence of one or more carbamate sites and vice versa, the resulting product of absorption will remain as a stable carbamate even in the presence of water or other forms of one or more OH— ions. On the other hand, if one or more protonated sites, in the presence of one or more carbamate sites are unstable or not relatively or substantially stable, or vice versa, one or more carbamate products will decompose into one or more carbonate/bicarbonate products (i.e., equation 4). It may be notably important to emphasize that the overall stability of one or more carbamate products in the capture solution may be the result of the collaboration between the relative stability of one or more protonated sites in the presence of one or more carbamate sites, and vice versa, or in other word, the "inter-site stability" of these protonated and carbamate sites. Practically, the inter-site stability may be achieved by structurally modulating site structure to designate a fixed role for specific molecular site type, one of which is more prone to protonation, and the other is more prone to carbamate ion formation as shown in FIG. 2. This novel concept of inter-site stability of one or more carbamate sites and one or more protonated sites provides or brings forth an opportunity to modify the amine systems, which form unstable carbamate, into amine systems that only form stable carbamate. Through structural modulation, one or more geometrical properties and/or one or more chemical properties of one or more protonated sites and one or more carbamate sites may be simultaneously tuned in such a manner that the one or more geometrical properties and/or the one or more chemical properties may collaboratively stabilize the carbamate products. In some embodiments, the one or more geometrical properties and/or the one or more chemical properties may be, comprise, include, or consist of basicity, steric hindrance, nucleophilicity, or a combination thereof. It may be worth noting that even though one or more amine systems follow at least one zwitterions mechanism, other amine solvents, especially when amine molecules are small enough, may also participate in at least one intermolecular reaction to form carbonate/bicarbonate.

Figure 3:
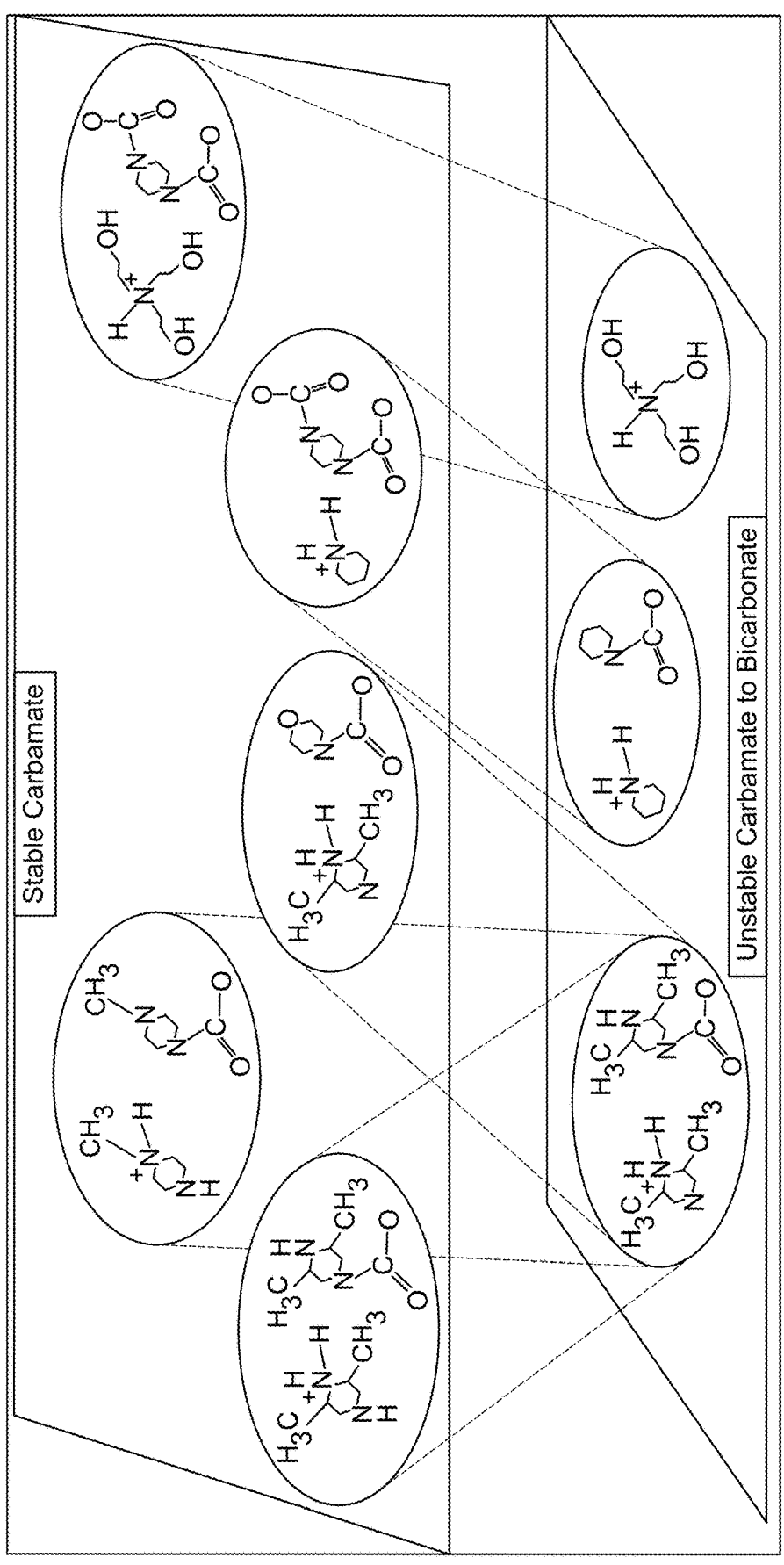
FIG. 3 illustrates schematics of inter-site induction by intramolecular and intermolecular site structure modulation for an amine capture solution, according to one or more embodiments of the present disclosure.

In some embodiments, the present methods disclose herein comprise at least two scenarios or chains of events to exemplify applications of the novel concept of inter-site stability of one or more carbamate sites and one or more protonated sites in improving chemistry of capture amine solvents starting from those, producing carbonate/bicarbonate at equilibrium conversion as shown in FIG. 3. Based on the principle of inter-site stability or role designation, the improved solvent systems disclosed herein may induce the sole formation of stable carbamate as the amine solution is fully converted. In a first scenario or chain of events, the induction of the stable carbamate product may be provided, achieved, and/or completed through at least one intra-molecular structure modulation. In the second scenario or chain of events, at least one inter-molecular structure modulation may provide and/or induce the stability to achieve or produce the stable carbamate product.

Figure 4:
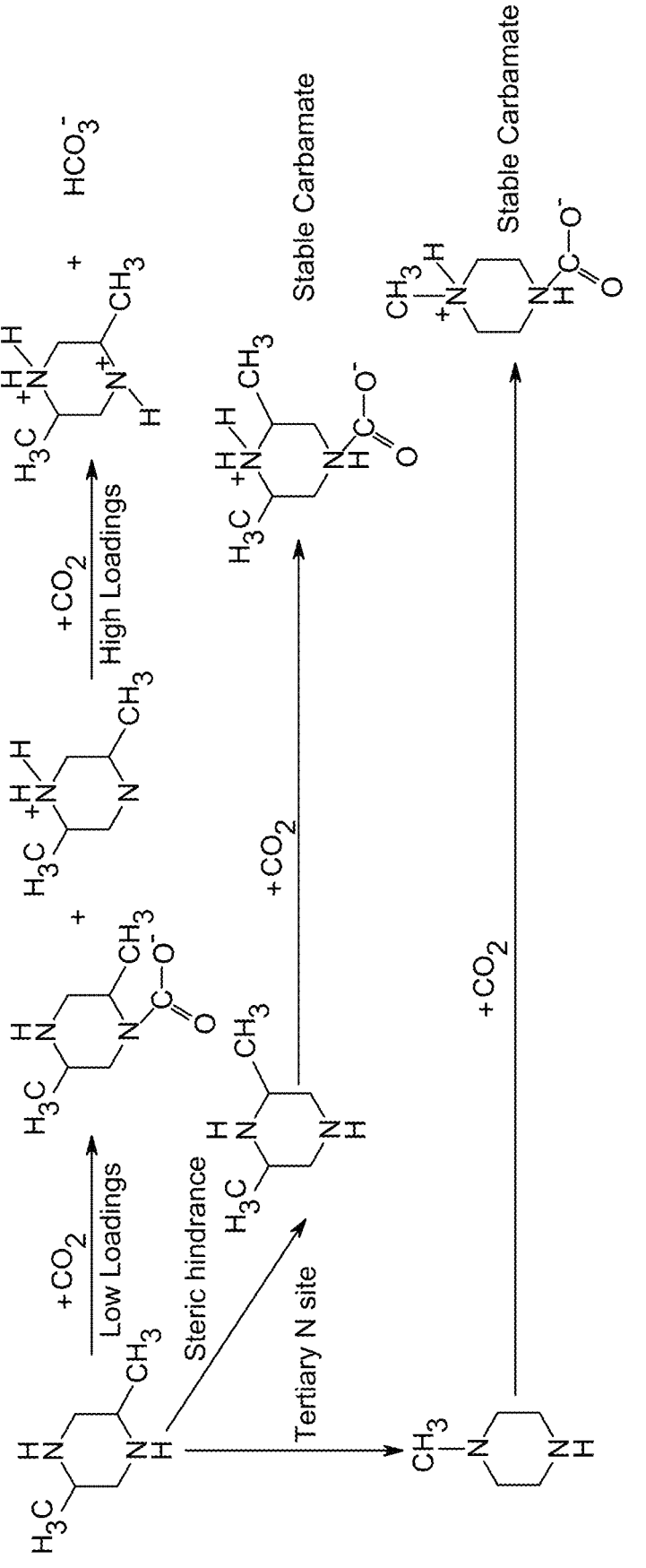
FIG. 4 illustrates a schematic example of inter-site stability induced by intramolecular site structure modulation for a cyclic amine capture solution, according to one or more embodiments of the present disclosure.

In the first scenario or chain of events, at least one amine solution containing 2,5-dimethyl-piperazine in water as a diluent is provided as shown in FIG. 4. At the low amine conversion, the dominant product is carbamate, while at higher conversion, the formed carbamate decomposes into bicarbonate. In this amine solution, both of the protonated site and the carbamate site are structurally equivalent, in the form of $NH_2^+(CHCH_3)CH_2$ and $NCOO^-(CHCH_3)CH_2$, respectively. Both of the protonated site and the carbamate site may be exposed to some steric effect by a methyl group at the alpha position. The equivalency of the protonated and carbamate sites makes the carbamate product less stable. In order to prohibit the decomposition of carbamate, inter-site stability of both of the protonated and carbamate sites may be improved. There are at least two methods or processes to intra-molecularly modulate the structure disclosed herein. A first method or process may be to impose a greater steric hindrance on the protonated site at the same time removing the steric hindrance on the carbamate site. The modulation may be achieved by adding a methyl group to the alpha position for the protonated site, while removing the methyl group at the alpha position for the carbamate site. This modification may enhance or substantially enhance the preference of $NH(CHCH_3)_2$ site to be protonated as compared to $NH(CH_2)_2$ site, which may be preferable to be a carbamate site. As a result, at maximum CO2 loadings, the formed carbamate is stabilized even in the presence of water. A second method or process to improve carbamate stability through structural modification starting with solution of 2,5-dimethyl-piperazine may be to change, convert, or turn one nitrogen site (hereinafter "N site") into a tertiary amine site, which may be designated as a protonated site by moving a methyl group from the alpha position to a 1-position, while removing the steric hindrance on the other N site, which may serve as a carbamate site. Consequently, at equilibrium conversion, the resulting carbamate product may be stabilized with $NH^+(CH_2)_2CH_3$ site to be the protonated site while $NH(CH_2)_2$ holds CO2 as the carbamate site. In both modifications, one site becomes preferable to be protonated as compared to the other and the other site becomes for prone toward holding CO2 as carbamate. Such role designation stabilizes the inter-site interaction in the capture solution, thus promoting the overall stability of the carbamate product. In the second method or process, both of the protonated site and the carbamate site are intra-molecularly connected in the same amine molecule.

Figure 5:
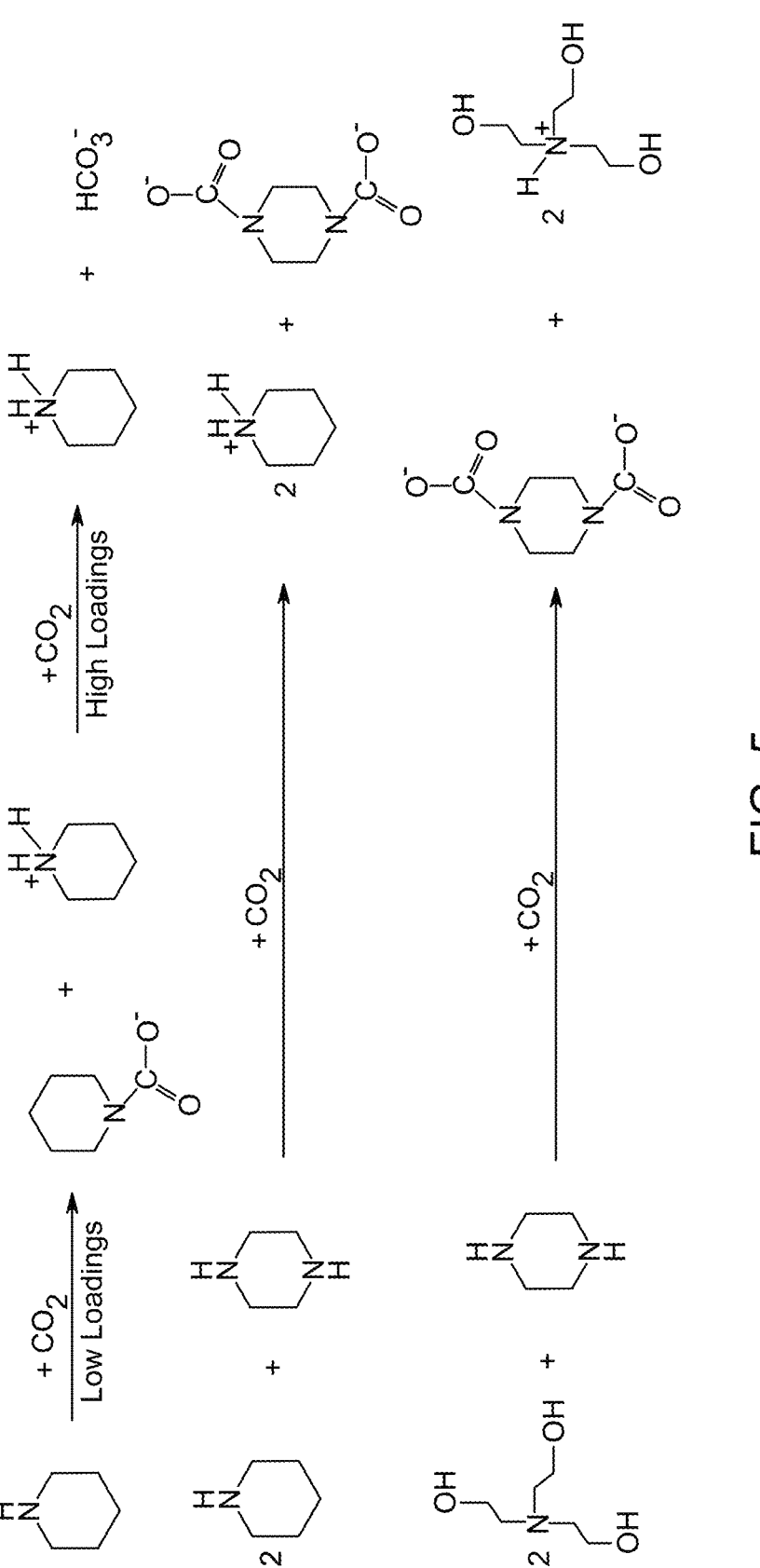
FIG. 5 illustrates a schematic example of inter-site stability induced by intermolecular site structure modulation for a cyclic amine capture solution and capture solution blends comprising at least one cyclic amine, according to one or more embodiments of the present disclosure.

In one or more embodiments, a different method or process may be utilized with 2,5-dimethyl-piperazine to illustrate the inter-molecular structure modulation as shown in FIG. 5. The two N sites of 2,5-dimethyl-piperazine are equivalent and exposed to weak steric effect. Instead of changing, converting, or tuning one of these N sites, a new molecular site may be added into the improved solvent system. In some embodiments, the new molecular site to be added may be $NH(CH_2)_2$ of morpholine, with considerably lower basicity or lower pKa of conjugated acid. With lower basicity and less steric exposure, the $NH(CH_2)_2$ site of morpholine may be more prone to hold CO2 and form the carbamate ion while the $NH(CH_2)_2CH_3$ sites of 2,5-dimethyl-piperazine may be more preferable for protonation. As a result, the aqueous mixture of morpholine and 2,5-dimethyl-piperazine with a molar ratio of about 2:1 may form at least one stable carbamate product. In one or more embodiments, the molar ratio of morpholine to 2,5-dimethyl-piperazine may be from about 0.5:1 to about 3:1, from about 1:1 to about 3:1, from about 1:1 to about 2:1, about 0.5:1, about 1:1, about 2:1, or about 3:1.

In some embodiments, an aqueous piperidine system and aqueous triethanolamine is provided or utilized as shown in FIG. 5. While a solution of piperidine may absorb CO2 aqueous to form unstable carbamate, which may decompose into bicarbonate at maximum loadings, triethanolamine may or may only react with CO2 to form bicarbonate. Like in the first method or process, the resulting carbamate product may be stabilized by applying the concept of inter-site stability, but through the intermolecular modulation in this embodiment. The $NH(CH_2)_2$ site of piperidine is highly basic, thus strongly prefers to be protonated. Similarly, triethanolamine is a tertiary amine, which cannot accommodate CO2 binding. The reasonable inter-site stability induction may be addition of a new molecular site that is preferable to hold CO2 as a carbamate ion. Each starting amine solvent may be mixed with piperazine, whose $NH(CH_2)_2$ sites are medium basic and less exposed to steric effect, with the molar ratio of about 2:1. In both resulting capture solutions, carbamate $NCOO^-(CH_2)_2$ sites of piperazine are stabilized in the presence of a $NH^+(CH_2)_2$ site of the triethanolamine and in the presence of the $NH_2^+(CH_2)_2$ site of the piperidine. This enhanced inter-site stability promotes, substantially promotes, or only promotes selectivity toward formation of carbamate at maximum conversion. Through examples disclosed herein, it is demonstrated that, the principle of inter-site stability of the protonated sites and the carbamate sites may play at least one role in determining the selectivity of the final absorption or resulting products and/or may be flexibly applied in an amine structure designing phase to target resulting products that are, include, comprise, or consist of stable carbamate products.

The improved solvent systems and methods disclosed herein may comprise an engineering-scale development of absorption technology that may be based on one or more multiple aspects including, for example, but not limited to predictive process control, rigorous process monitoring, or a combination thereof. However, the one or more multiple aspects may be hindrance because the underlying challenges behind this hindrance may be a lack or misunderstanding of mechanistic insights to identify potential amine systems, whose product distribution, with fixed physical/chemical properties, is stable under process operation conditions. Although it has been accepted that most neat capture solutions might form carbamate when capturing carbon dioxide, the inevitably significant amount of water in the flue gas is commonly attributed to be the main reason for the formation of carbonate/bicarbonate or even complex mixtures of these products. In this disclosure, a new concept of inter-site stability is introduced to rationalize the capture product formation as well as to effectively guide amine solvent design based on chemical structure of the molecule with the amino sites. The fundamental mechanism of this inter-site stability is experimentally and computationally substantiated by an observed "hopping" phenomenon of proton and carbamate between different amino sites in the amine solution. To demonstrate the application of this mechanistic understanding, some amine systems, forming unstable carbamate as product in the presence of water, are also modified based on the inter-site stability rationale to induce higher product stability and uniformity.

EXAMPLES

Figures 6, 7, 8:
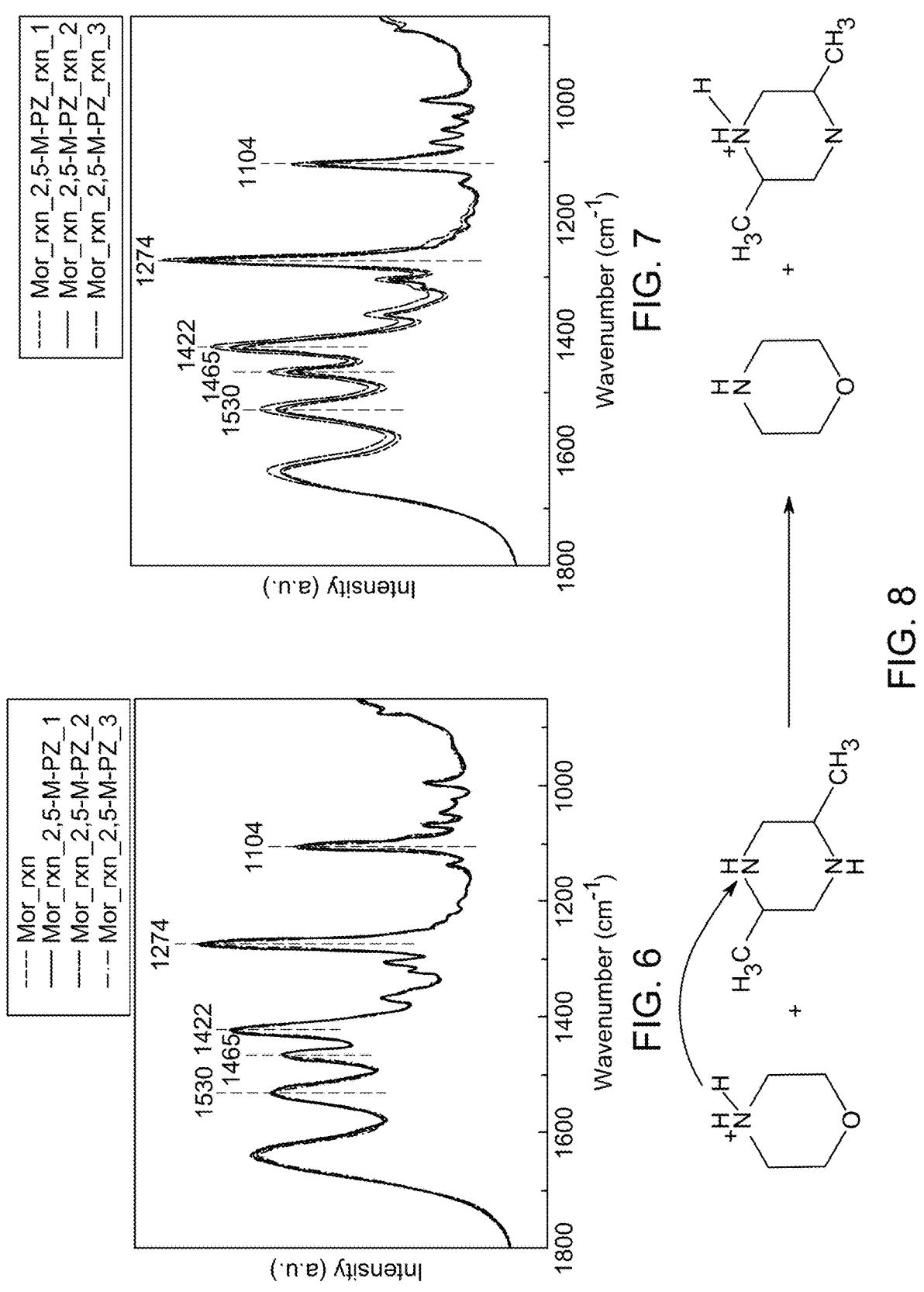
FIG. 6 is a graphical illustration of FTIR spectrums for an aqueous solution of morpholine and aqueous solution blends of morpholine and 2,5-dimethyl-piperazine at different CO2 loadings, according to one or more embodiments of the present disclosure.
FIG. 7 is a graphical illustration of FTIR spectrums for the aqueous solution and the aqueous solution blends shown in FIG. 6 after the proton from $NH_2^+(CH_2)_2$ of morpholine "hops" and/or moves to 2,5-dimethyl-piperazine at different CO2 loadings, according to one or more embodiments of the present disclosure.
FIG. 8 illustrates schematics of reaction pathway of the proton from the $NH_2^+(CH_2)_2$ of the morpholine "hopping" and/or moving to the 2,5-dimethyl-piperazine, according to one or more embodiments of the present disclosure.

In a first example, an aqueous solution of morpholine contacts CO2 and only carbamate is formed. This is evidenced, as shown in FIGS. 6 and 7, by the presence of C=O asymmetric, and symmetric stretching bands at 1530 cm$^{-1}$, 1422 cm$^{-1}$, respectively, as well as N—COO— stretching band at 1274 cm$^{-1}$. It is worth noting that, as the CO2 loading increases, the C—N stretching band at 1097 cm$^{-1}$ shifts to 1104 cm$^{-1}$ and increases strongly in intensity. Such behavior may be assigned to the protonation of $NH(CH_2)_2$ amino site of morpholine. At theoretically maximal CO2 loadings, 2 moles of morpholine are required to capture 1 mole of CO2 as carbamate product. When neat 2,5-dimethyl-piperazine is added to the fully converted solution of morpholine, most carbamate product featuring bands experience negligible change except for the C—N band of protonated amino site at 1104 cm$^{-1}$, whose intensity is notably reduced. The intensity reduction of C—N band at 1104 cm$^{-1}$ suggests the consumption of protonated $NH(CH_2)_2$ amino sites of morpholine. As the new blend of amino sites solution absorbs more new molecules of CO2, signature bands of carbamate, including C=O asymmetric, and symmetric stretching band, as well as N—COO— stretching band from morpholine are observed to increase in intensity. The increase in the carbamate bands by morpholine corresponding to CO2 absorption in the second reaction stage indicates the availability of $NH(CH_2)_2$ amino sites on morpholine. This supports the hypothesis that proton from $NH_2^+(CH_2)_2$ of morpholine "hops" to 2,5-dimethyl-piperazine, as demonstrated in FIG. 8, which then opens more amino sites for more carbamate formation. Besides, the asymmetrical stretching band of carbamate formed from 2,5-dimethyl-piperazine is not observed. This absence of carbamate formed by added amine implies that all newly formed carbamate ions are held by amino site of morpholine. The preference in protonation of specific amino site in this case of study may be assigned to the difference in the basicity of nitrogen lone pair. Comparing the basicity of amino sites, the pKa of amino site of morpholine is less than that of 2,5-dimethyl-piperazine. Thus, it is more preferable for 2,5-dimethyl-piperazine to be protonated in the mixed solution with morpholine.

Figures 9, 10:
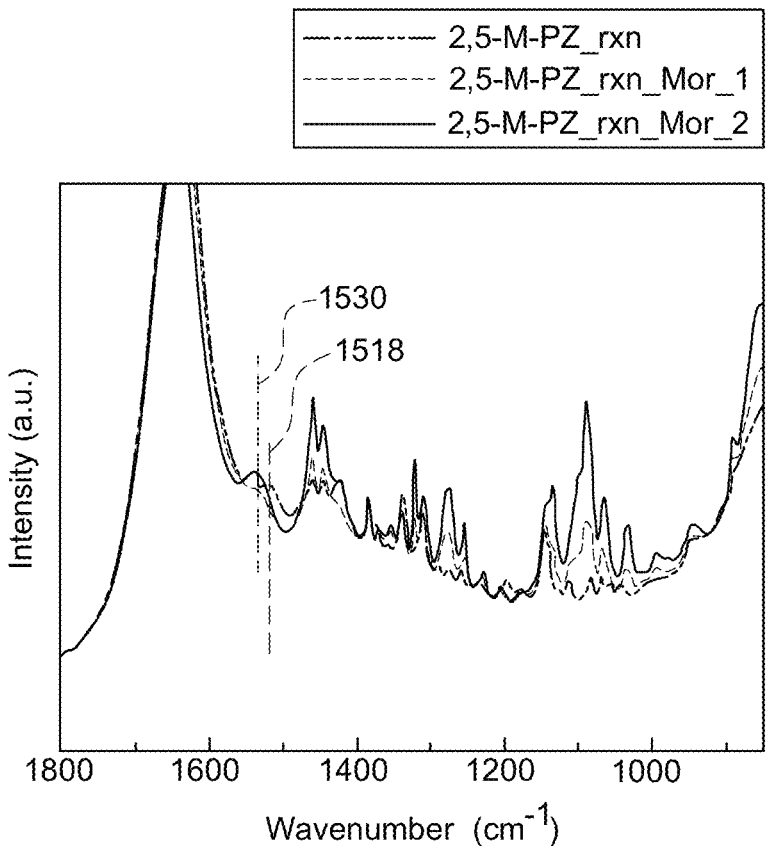
FIG. 9 is a graphical illustration of FTIR spectrums for aqueous solution of 2,5-dimethyl-piperazine and aqueous solution blends of morpholine and 2,5-dimethyl-piperazine at different CO2 loadings, according to one or more embodiments of the present disclosure.
FIG. 10 illustrates schematics of reaction pathway of $COO^-$ of 2,5-dimethyl-piperazine "hopping" and/or moving to morpholine, according to one or more embodiments of the present disclosure.

In a second example, the same amine blending containing 2,5-dimethyl-piperazine and morpholine is utilized, but in reversal experimental order was studied to shed more light on the site transfer as shown in FIGS. 9 and 10. When the aqueous solution of 2,5-dimethyl-piperazine absorbs carbon dioxide at low loading, only carbamate product is detected by IR spectroscopy with the fingerprint of asymmetric C=O stretching appears at 1518 cm$^{-1}$ as shown in FIG. 9. Surprisingly, as morpholine is slowly added to the reacted solution of 2,5-methyl-piperazine, the C=O stretching band initially drops in intensity and shifts to higher wavenumber at 1530 cm$^{-1}$ afterward. The emergence of the peak at 1530 cm$^{-1}$ coincides with the signature band of carbamate formed by morpholine. This observation strongly illustrates that in the capture solution, the carbamate site spontaneously "hops" from 2,5-dimethyl-piperazine to morpholine amino site. From the structural viewpoint, carbamate formed by 2,5-dimethyl-piperazine are under stronger steric hindrance, caused more by nearby methyl groups, than morpholine. Consequently, the $NH(CH_2)_2$ amino site of morpholine is relatively preferable to hold the carbamate moiety in the mixed solution with 2,5-dimethyl-piperazine as shown in FIG. 10. In some embodiments, the preference of some amino structures to be protonated or to hold carbamate moiety may be rationalized; however, the spontaneous transfer or "hop" of those moieties within an amino site blend has not been previously reported.

Figure 11:
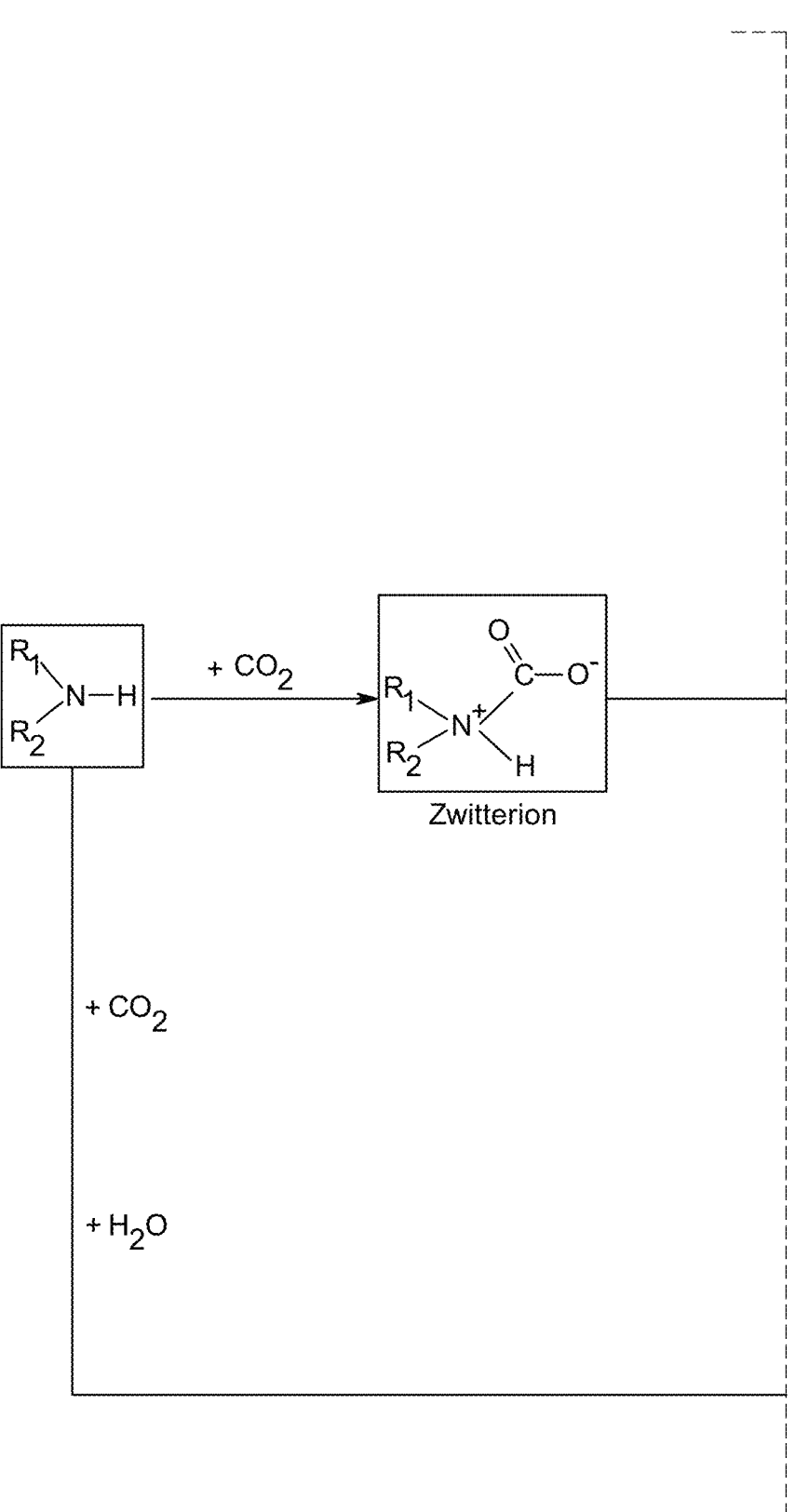
FIG. 11 illustrates schematics of inter-site stability of protonated and carbamate sites in an amine capture solution, according to one or more embodiments of the present disclosure.
Figure 11:
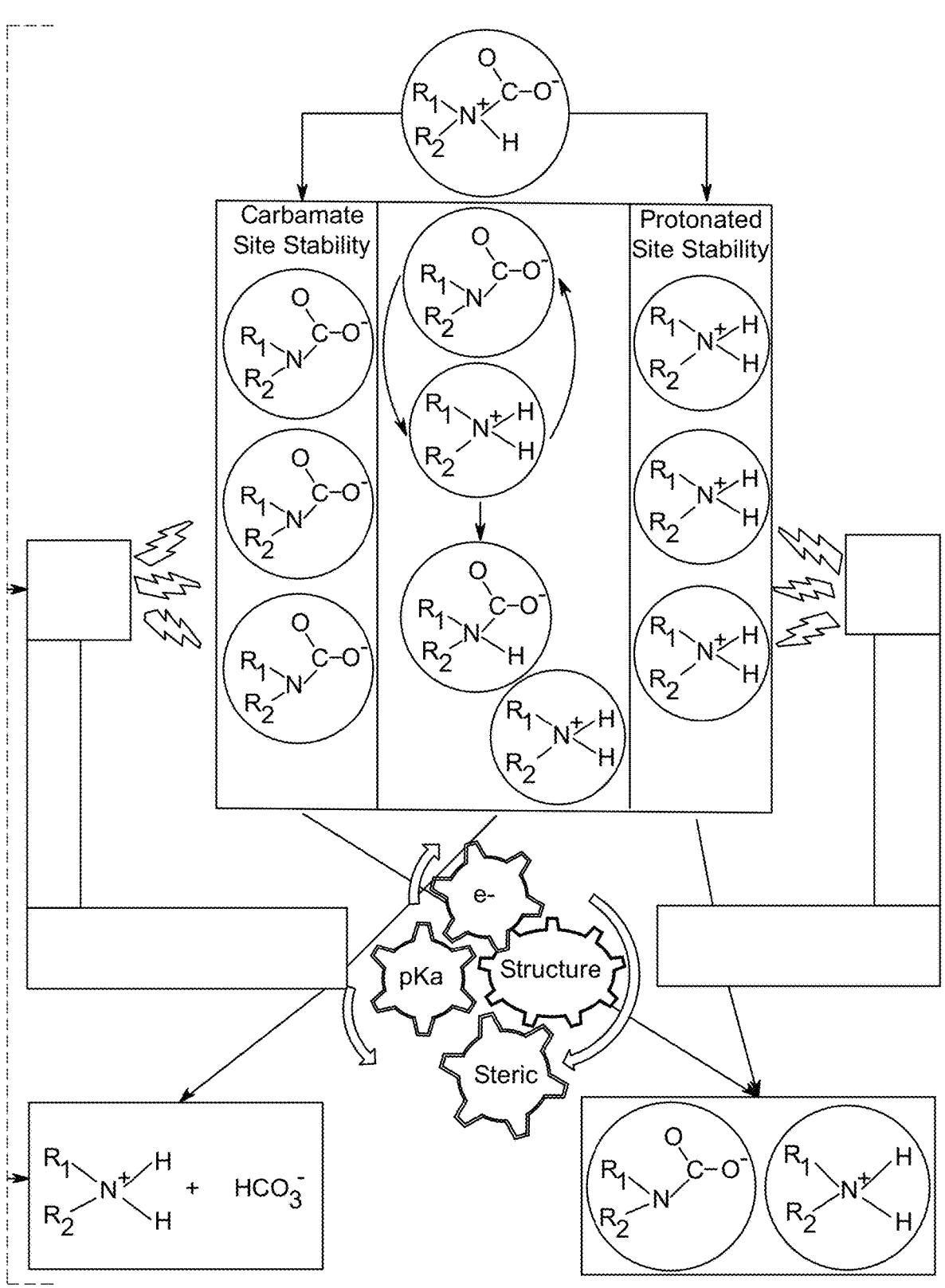

In one or more embodiments, such spontaneous "hopping" behavior as described herein may imply that the appearance of a more preferable type of site, as compared to the present site population in the amine solution, for protonation or carbamate moiety holding may cause at least one rearrangement of the carbamate and proton moieties. In other words, the solution, after new combination type of sites is added, is more stable. Following this line of rationale, the concept of "inter-site stability" of carbamate and protonated sites may be a governing factor for the stability of carbamate products. The inter-site stability states that within a population of amino sites, the stability of carbamate may be relative to the protonated nitrogen site and an increase in the preference distinguishment for protonation or carbamate holding between different types of sites may enhance the stability of carbamate product. The spirit of the inter-site stability may be summarized in the FIG. 11. Besides being justified from the "hopping" phenomenon described herein, the inter-site stability may be rationalized from chemistry studies. It has been shown, theoretically through computational work, that as CO2 is absorbed by the amine solvents, the lone pair electrons of nitrogen atom of amine attack the electrophilic carbon atom of CO2 to form a zwitterion. The zwitterion then transfers the proton to a different site to form carbamate ion. The carbamate and protonated sites are intermolecularly in contact making this state to be critical to the overall stability of the carbamate product. If protonated sites are relatively stable in the presence of carbamate sites and vice versa, the final product of absorption will remain as stable carbamate even in the presence of water or other forms of OH ions. On the other hand, if protonated sites, in the presence of carbamate sites are not relatively stable, or vice versa, carbamate products will decompose into carbonate/bicarbonate products. It is notably important to emphasize that the overall stability of carbamate products in the solution is the result of the collaboration between the relative stability of protonated sites in the presence of carbamate sites, and vice versa, or in other word, the "inter-site stability" of these sites. Practically, the inter-site stability may be achieved by structurally modulating site structure to designate a fixed role for specific site type, one of which is more prone to protonation, and the other is more prone to carbamate ion formation. This novel concept of inter-site stability of carbamate and protonated sites brings forth the opportunity to modify amine systems, which form unstable carbamate, into amine systems that only form stable carbamate. Through structural modulation, geometrical and chemical properties of protonated and carbamate sites such as basicity, steric hindrance, nucleophilicity, and so on may be simultaneously tuned in such a manner that they collaboratively stabilize the carbamate products. It is worth noting that even though most amine systems follow the zwitterions mechanism as mentioned above, a few amine solvents, especially when amine molecules are small enough like with MEA, also participate in termolecular reaction to form carbonate/bicarbonate.

In a further example, two scenarios are provided and examined to exemplify applications of the concept of inter-site stability of carbamate and protonated sites for improving the chemistry of capture amine solvents starting from those, producing carbonate/bicarbonate at equilibrium conversion. The improved solvent systems and methods disclosed herein will or may induce the sole formation of stable carbamate as the solution is fully converted based on the principle of inter-site stability or role designation. In a first scenario, the induction of stable carbamate product is done through the intra-molecular structure modulation, whereby, inter-molecular structure modulation induces the stability that is presented in the second scenario.

Figure 12:
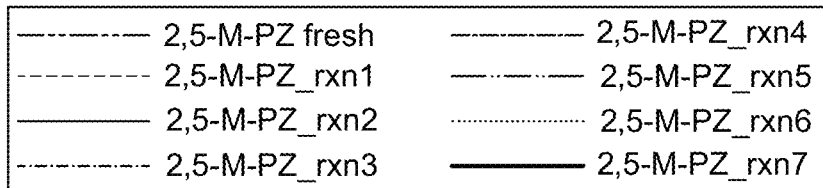
FIG. 12 is a graphical illustration of FTIR spectrums for an aqueous solution of 2,5-dimethyl-piperazine at different CO2 loadings, according to one or more embodiments of the present disclosure.
Figure 12:
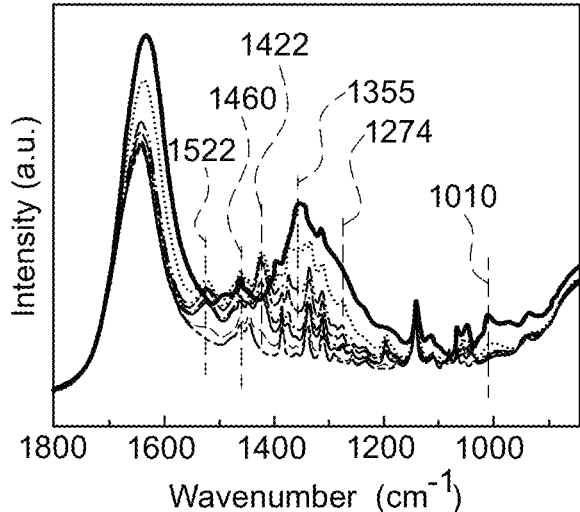

First Scenario: Inter-Sites Stability Induction by Intramolecular Site Modulation The first scenario utilizes an amine solution containing 2,5-dimethyl-piperazine in water as a diluent. At the low amine conversion, the dominant product is carbamate. The FTIR spectra of this amine solution at low $CO_2$ loading exhibits main evolving bands around $1520 \, cm^{-1}$, $1422 \, cm^{-1}$, $1460 \, cm^{-1}$, and $1274 \, cm^{-1}$, which correspond to the vibrational mode of asymmetric, symmetric $C=O$ stretching, $N-H$ bending of $NH_2^+$, and $N-C$ stretching of $N-COO-$ respectively. All of these bands may be assigned to the formation of carbamate by 2,5-dimethyl-piperazine, as shown in FIG. 12. As the amine solution captures more $CO_2$ at higher amine conversion, the formed carbamate decomposes, signified by the disappearance of $C=O$ asymmetric band (1520 cm-1) of carbamate. At the same, as $CO_2$ loading approaches equilibrium, FTIR fingerprints of bicarbonate, including broad band of $C=O$ stretching of $HCO_3^-$ at $1355 \, cm^{-1}$, $C-O$ stretching of $HCO_3^-$ at $1010 \, cm^{-1}$, become more intense. This behavior may be reported as the decomposition of carbamate to bicarbonate product. In the view of inter-site stability concept disclosed herein, protonated site and carbamate site of 2,5-dimethyl-piperazine are structurally equivalent, in the form of $NH_2^+(CHCH_3)CH_2$ and $NCOO-(CHCH_3)CH_2$, respectively. Both protonated site and carbamate site are exposed to some steric effect by a methyl group at the alpha position. The equivalency of protonated and carbamate sites makes the carbamate product less stable. To prohibit the decomposition of carbamate, inter-site stability of both sites should and/or must be improved.

There are two ways or methods to modulate the structure intra-molecularly. A first way or method is to impose a greater steric hindrance on the protonated site at the same time removing the steric hindrance on the carbamate site.

Figure 13:
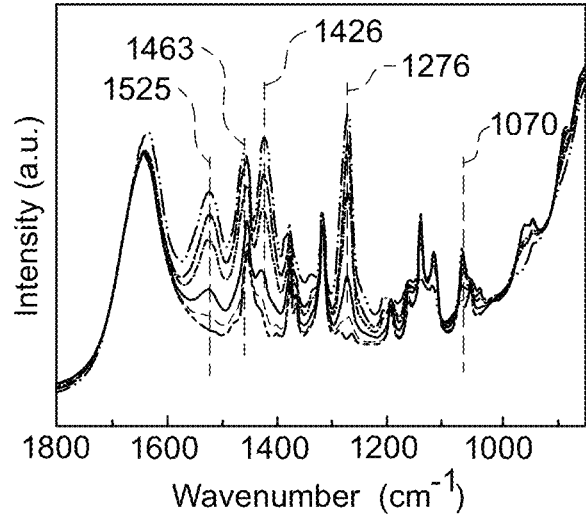
FIG. 13 is a graphical illustration of FTIR spectrums for an aqueous solution of 2,6-dimethyl-piperazine at different CO2 loadings, according to one or more embodiments of the present disclosure.

The first modulation can be achieved by adding a methyl group to the alpha position for protonated site, while removing the methyl group at the alpha position for carbamate site as shown in FIG. 4. This first modification significantly enhances the preference of $NH(CHCH_3)_2$ site to be protonated as compared to $NH(CH_2)_2$ site, which is now becoming preferable to be carbamate site. To examine the first modification, the $CO_2$ capturing of 2,6-dimethyl-piperazine solution was utilized and investigated. The experimental results show that at all $CO_2$ loadings, only carbamate is formed, evidenced by the absence of two main bicarbonate FTIR features at around $1355 \, cm^{-1}$ and $1010 \, cm^{-1}$ as shown in FIG. 13. In other words, the stability of carbamate product is induced even in the presence of water by a site modulation. It is significant to note that even at maximal amine conversion, 2,6-dimethyl-piperazine does not show any signed of dicarbamate, whose $N-COO-$ band locates around $1285 \, cm^{-1}$; namely one of the amino sites, $NH(CHCH_3)_2$ site, is restricted from $CO_2$ binding. The inter-site stability is applied via the specialization of amino sites in the structural modulation which then improves stability of carbamate product.

Figure 14:
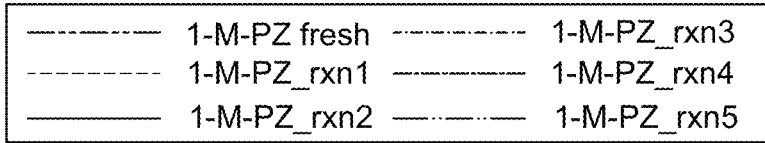
FIG. 14 is a graphical illustration of FTIR spectrums for an aqueous solution of 1-methyl-piperazine at different CO2 loadings, according to one or more embodiments of the present disclosure.
Figure 14:
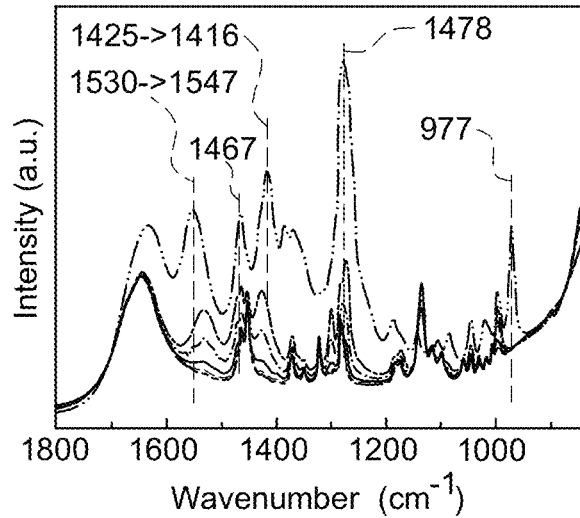

A second way or method to improve carbamate stability through structural modification starting with solution of 2,5-dimethyl-piperazine is to turn one N site into tertiary amine site, which may be designated for protonated site by moving methyl group from alpha position to 1-position, while removing the steric hindrance on the other N site, which will serve as a carbamate site. A study on $CO_2$ absorption by 1-methyl-piperazine is conducted as a showcase, whose results are shown in FIG. 14. The incremental FTIR spectra during $CO_2$ absorption again only show carbamate features, including $1547 \, cm^{-1}$, $1416 \, cm^{-1}$, $1467 \, cm^{-1}$, and $1278 \, cm^{-1}$, which correspond to the vibrational mode of asymmetric, symmetric $C=O$ stretching, $N-H$ bending of $NH_2^+$, and $N-C$ stretching of $N-COO-$, respectively. Again, the structural modification remarkably enhances the stability of carbamate of the amine capture solution. In this application, for example; however, when the conversion is at higher extent, the stretching band of $C=O$ blue-shifts from $1530 \, cm^{-1}$ to $1547 \, cm^{-1}$ while a very strong band appears at $977 \, cm^{-1}$, which is attributed to the $C-N-H$ twisting mode. Even though the roles of amino sites of 1-methyl-piperazine may be predicted from chemical structure as disclosed herein, it is worth showing rigorously that at equilibrium conversion, each type of site only plays its supposed role. In specific, while $NCH_3(CH_2)_2$ can only be the protonated site, $NH(CH_2)_2$ may accept both carbamate and proton moiety. A simple experiment is carried out to clarify the issue. After 1-methyl-piperazine fully reacts with $CO_2$, the solution is divided into two samples for comparison. The first sample is added with water, and the second sample is added with neat 1-methyl-piperazine. Their corresponding FTIR spectra are then collected and presented in FIG. 14. When reacted amine is diluted by water, the only effect is a decrease in the intensity of all peaks. On the contrary, when neat amine is added, asymmetric stretching band of $C=O$ gradually red-shifts and ratio of peak $977 \, cm^{-1}$ to $1000 \, cm^{-1}$ significantly decreases. This is due to the transfer of some proton from $NH^+CH_3$ $(CH_2)_2$ back to newly added $NH(CH_2)_2$ site. In other words, when the capture solution accommodates more $CO_2$ at higher conversion, the specialization of amino sites happens, forcing all protons to tertiary amino site, $NCH_3(CH_2)_2$, leaving all secondary sites, $NH(CH_2)_2$, available for carbamate moiety formation. As a result, at equilibrium conversion, carbamate product is stabilized with $NH^+(CH_2)_2CH_3$ site to be the protonated site while $NH(CH_2)_2$ holds CO2 as the carbamate site. In both given examples, one amino site becomes greatly or substantially preferable to be protonated as compared to the other and the other site in the same amine molecule also becomes more prone toward holding CO2 as carbamate. Such role designation stabilizes the inter-site interaction in the amine capture solution, thus promoting the overall stability of the carbamate product. In this scenario, both protonated site and carbamate site are intra-molecularly connected in the same amine molecule.

In yet another example, formation of zwitterion and its subsequent proton transfer process happen spontaneously within some amino site collection in the solution regardless of the molecular origin of the sites. Namely, the amino sites may come from the same molecule, in the case of diamines or triamines, or from different molecules. At least one similarity in carbamate and bicarbonate formation route between aqueous monoamines and diamines has been observed. The inter-sites stability may also be induced by the intermolecular site modulation, or in other words, physical site mixing. This implies that if two amine solutions, one of which is more prone to be protonated and the other which prefers to hold the carbamate sites, were mixed, the formed carbamate would be more stable under CO2 absorption conditions.

Figure 15:
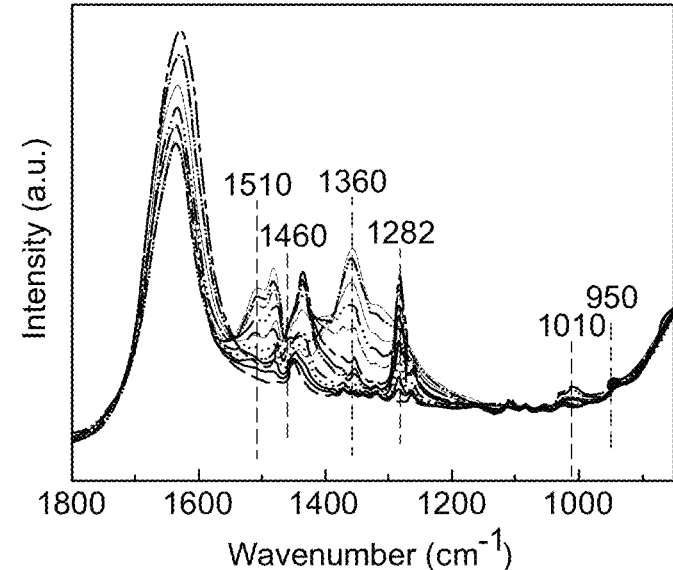
FIG. 15 is a graphical illustration of FTIR spectrums for an aqueous solution of piperidine at different CO2 loadings, according to one or more embodiments of the present disclosure.
Figure 17:
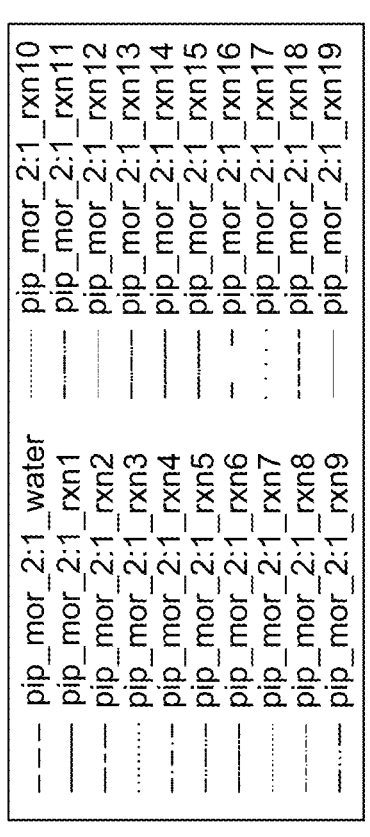
FIG. 17 is a graphical illustration of FTIR spectrums for aqueous solution blends of piperidine and morpholine at different CO2 loadings, according to one or more embodiments of the present disclosure.
Figure 17:
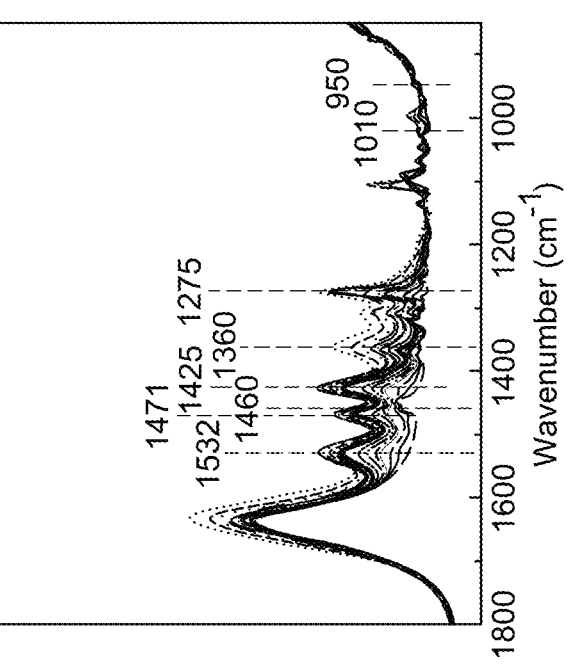
Figure 16:
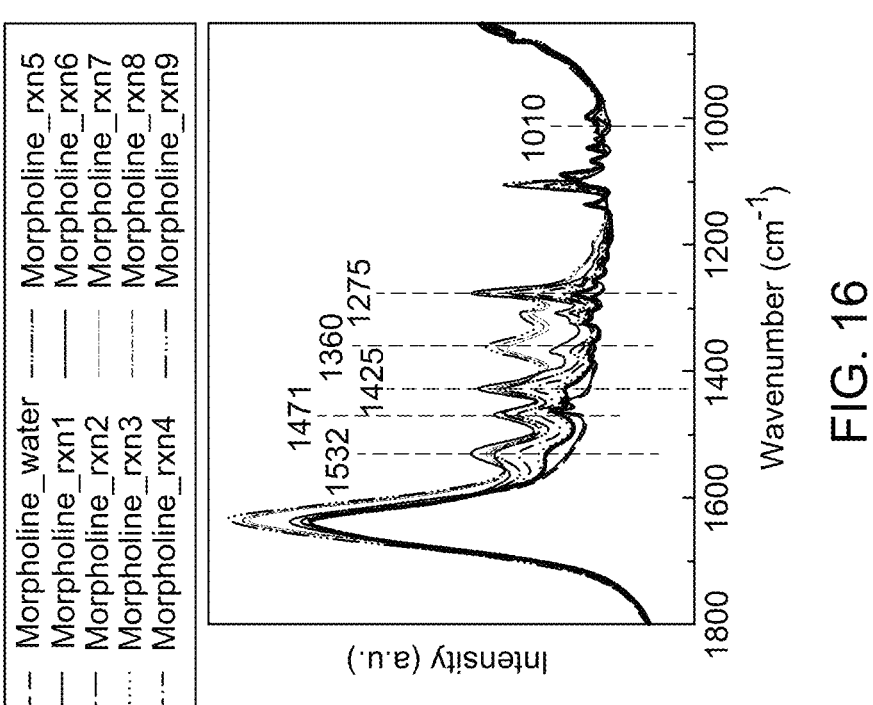
FIG. 16 is a graphical illustration of FTIR spectrums for an aqueous solution of morpholine at different CO2 loadings, according to one or more embodiments of the present disclosure.

The reaction of CO2 and aqueous solutions of piperidine and morpholine has been monitor by IR and shown in FIGS. 15-18. At the low amine conversion, IR spectra of reacted piperidine exhibited absorption bands at 1510 cm$^{-1}$, 1430 cm$^{-1}$, 1460 cm$^{-1}$, and 1282 cm$^{-1}$, which may be assigned to the asymmetric, symmetric mode of C=O stretching of carbamate, N—H bending of $NH_2^+$, and N—C stretching of $NCOO^-$, respectively, as shown in FIG. 15. At maximal piperidine conversion, all carbamate is decomposed into bicarbonate, signified by strong 1360 cm$^{-1}$ band of C=O stretching from $HCO_3$, 1010 cm$^{-1}$ of C—O stretching, and 950 cm$^{-1}$ of N—H twisting. These spectroscopic observation and assignments are consistent with previous studies. The spectral behaviors of morpholine and piperidine are alike or substantially alike. Carbamate is formed at low morpholine conversion, signified by the C=O asymmetric, symmetric stretching (1532 cm$^{-1}$ and 1425 cm$^{-1}$), and N—C stretching (1275 cm$^{-1}$), as shown in FIG. 16. The carbamate product formed by morpholine also experiences some decomposition, as the 1530 cm$^{-1}$ band decreases, but not at high extent as piperidine since at equilibrium conversion, there still exists a significant amount of carbamate present in the solution.

Figures 18, 19:
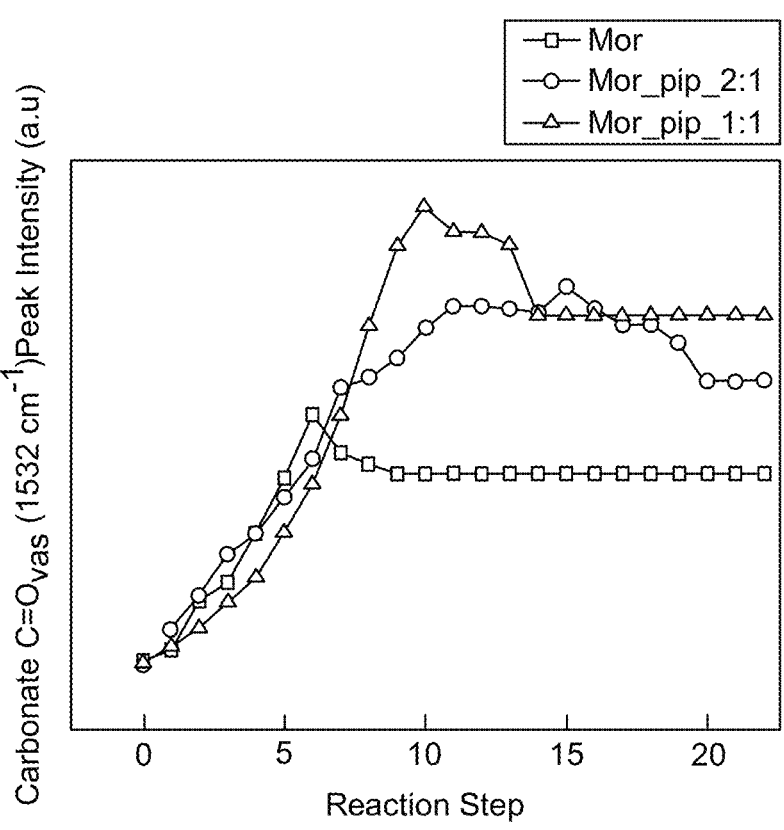
FIG. 18 is a graph illustrating reaction steps and concentrations of carbamate moiety product(s) for an aqueous solution of morpholine and aqueous solution blends of morpholine and piperidine at different CO2 loadings, according to one or more embodiments of the present disclosure.
FIG. 19 illustrates a schematic example of inter-site stability induced by intermolecular site structure modulation for a cyclic amine capture solution and capture solution blends comprising more than one cyclic amine, according to one or more embodiments of the present disclosure.

Amino site of piperidine has pKa=11.2 while that of morpholine has pKa=8.3. The great difference in basic strength between amino site of piperidine and amino site of morpholine suggests that piperidine will be protonated while morpholine will hold the carbamate moiety. In contact with CO2, the mixed solution of piperidine and morpholine shows the formation of carbamate at the low conversion. Some carbamate decomposition was also observed as the reaction reaches equilibrium conversion. It is worth noting that, even from the beginning of the reaction, carbamate moiety is only attached to the amino site of morpholine. This is evidenced by the strong and fixed peak of asymmetric stretching mode of C=O at 1532 cm$^{-1}$ and stretching mode of N—C bond from morpholine-COO$^-$. In conjunction with the increase in fingerprint band of morpholine-COO$^-$, 1460 cm$^{-1}$ and 950 cm$^{-1}$ band, ascribed as N—H bending $NH_2^+$ and N—H twisting of piperidine, are also well-defined even when no sign of bicarbonate is detected. These observations confirm the role preferability of piperidine and morpholine when the mixed amine solution reacts with CO2. Moreover, the carbamate product formed from the mixed amine solution of piperidine and morpholine exhibits improved stability as compared to either piperidine as shown in FIG. 19, whose sole product at equilibrium reaction is bicarbonate or morpholine. FIG. 18 illustrates that starting from the same molar concentration of morpholine, concentration of carbamate moiety product attached to morpholine increases as more piperidine is added to the solution. Likewise, the equilibrium concentration of carbamate moiety product formed by morpholine also increases following the incorporation of piperidine. These correlations are evidence of the inter-site stabilization. The enhancement in stability, induced by intermolecular modulation as in the case of piperidine and morpholine amine mixture, can be applied to widen the operational range of the absorption process in which a carbamate moiety is the unique absorption product, thus boosting the reliability of predictive control and monitoring model.

The present disclosure, along with the drawings discussed herein, demonstrate, through experimental observations and theoretical considerations, that within the amine solution and inventive solvent system disclosed herein, both carbamate moieties and protons may spontaneously "hop" between amino sites to reach a geometrically or chemically preferable nitrogen site. Using this as a foundation, it is proposed that the concept of inter-site stability is a governing factor to control the stability of the carbamate product for amine solutions. In practice, this new concept suggests that carbamate product during CO2 absorption in amine solution can be improved by designating different types of amino sites, through chemical or geometrical structure design, for specific role, one for protonation and one for carbamate moiety holding. As the difference of role preference between these two (2) site type increases, stability of carbamate is enhanced. Moreover, the inter-site stability may be induced via either intramolecular or intermolecular site modulation.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. An amine-based solvent for improving stability of carbamate during carbon dioxide capture, the amine-based solvent comprising:

at least one piperazine having a first molecular site that is structurally modified to be protonated and a second molecular site that is structurally modified to hold carbon dioxide as carbamate, wherein the first molecular site is a protonated site, the second molecular site is a carbamate site, and the at least one piperazine further comprises:

a methyl group present at an alpha position for the protonated site and an alpha position for the carbamate site that is free of a methyl group; or a methyl group present at 1-position for the protonated site and a nitrogen site for the carbamate that is free of steric hindrance.

2. The amine-based solvent of claim 1, wherein the at least one piperazine comprises 2,5-dimethyl-piperazine and the amine-based solvent further comprises morpholine.

3. The amine-based solvent of claim 2, wherein a proton from $NH_2+(CH_2)_2$ of morpholine is moved to the 2,5-dimethyl-piperazine.

4. The amine-based solvent of claim 3, wherein the $NH(CH_2)_2$ amino site of the morpholine is configured to hold a carbamate moiety in a mixed solution with the 2,5-dimethyl-piperazine.

5. A carbon dioxide capture system comprising:

at least one gaseous stream comprising carbon dioxide; and the amine-based solvent of claim 1 in contact with the at least one gaseous stream.

6. A method for preparing an amine-based solvent configured to improve stability of carbamate during carbon dioxide capture, the method comprising:

modifying at least one cyclic amine molecule by at least one of an intramolecular site structure modulation and an intermolecular site structure modulation to provide the amine-based solvent such that a first molecular site of the at least one cyclic amine molecule is configured to be protonated and a second molecular site of the at least one cyclic amine molecule is configured to hold carbon dioxide as carbamate, wherein the modification of the at least one cyclic amine further comprises:

adding a methyl group to an alpha position for the first molecular site to be protonated and removing a methyl group from an alpha position for the second molecular site to hold carbon dioxide as carbamate; or moving a methyl group from an alpha position to a 1-position for the first molecular site to be protonated and removing a steric hindrance on a N site for the second molecular site to hold carbon dioxide as carbamate.

7. The method of claim 6, further comprising:

intra-molecularly connecting the first molecular site and the second molecular site in the at least one cyclic amine molecule.

8. The method of claim 6, wherein the at least one cyclic amine comprises 2,5-dimethyl-piperazine, morpholine, or a combination thereof.

9. The method of claim 6, wherein the at least one cyclic amine comprises 2,5-dimethyl-piperazine, morpholine, piperidine, triethanolamine, or a combination thereof.

10. A method for carbon dioxide capture, the method comprising:

contacting the modified at least one cyclic amine molecule of claim 6 to a gaseous stream comprising carbon dioxide such that the modified at least one cyclic amine molecule chemically reacts with carbon dioxide to form a soluble compound.

11. The method of claim 10, further comprising at least one of:

separating the modified at least one cyclic amine molecule and/or the formed soluble compound from a remaining portion of the gaseous stream;

releasing the remaining portion of the gaseous stream; and separating the formed soluble compound from the modified at least one cyclic amine molecule.

12. An amine-based solvent for improving stability of carbamate during carbon dioxide capture, the amine-based solvent comprising:

at least one piperazine having a first molecular site that is structurally modified to be protonated and a second molecular site that is structural modified to hold carbon dioxide as carbamate, wherein the at least one piperazine comprises 2,5-dimethyl-piperazine having a structurally modification such that a methyl group is moved from an alpha position to a 1-position for the first molecular site and a methyl group for the second molecular site is excluded.

13. The amine-based solvent of claim 12, wherein the first molecular site is a protonated site and the second molecular site is a carbamate site and the protonated site and the carbamate site are intra-molecularly connected in the same amine molecule of the at least one piperazine.

14. The amine-based solvent of claim 12, wherein the amine-based solvent further comprises at least one of morpholine, piperidine, or triethanolamine.

* * * * *